July 6, 1943.   W. ARMSTRONG   2,323,640
LEVERED SUSPENSION LANDING GEAR
Filed June 10, 1940   4 Sheets-Sheet 1
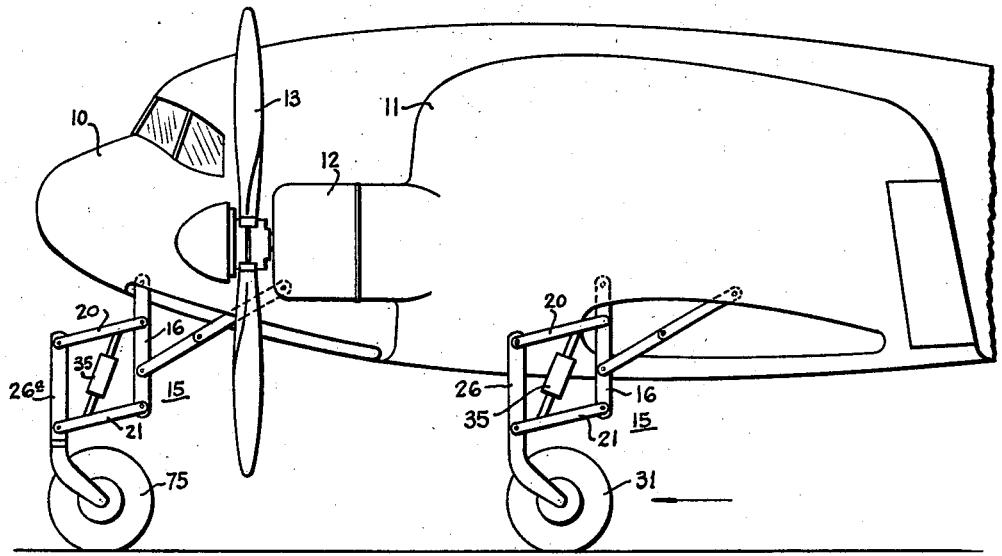
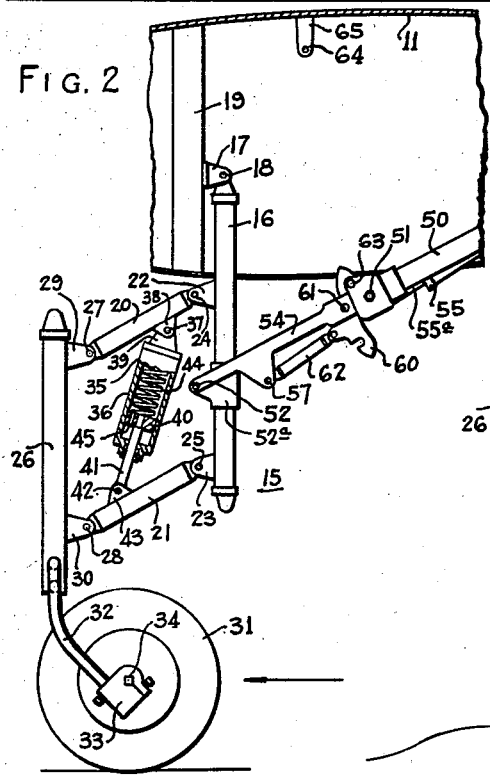
INVENTOR
WILLIAM ARMSTRONG
BY
ATTORNEYS July 6, 1943.  W. ARMSTRONG  2,323,640
LEVERED SUSPENSION LANDING GEAR
Filed June 10, 1940  4 Sheets-Sheet 2

INVENTOR
WILLIAM ARMSTRONG
ATTORNEYS

INVENTOR
WILLIAM ARMSTRONG
BY
ATTORNEYS

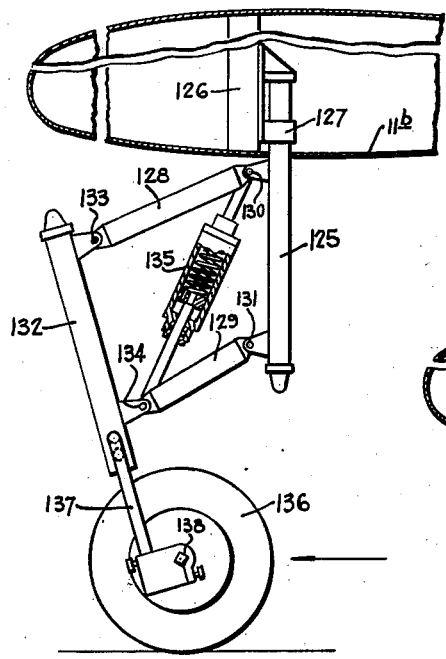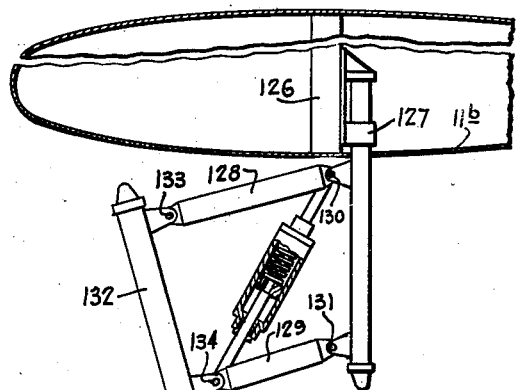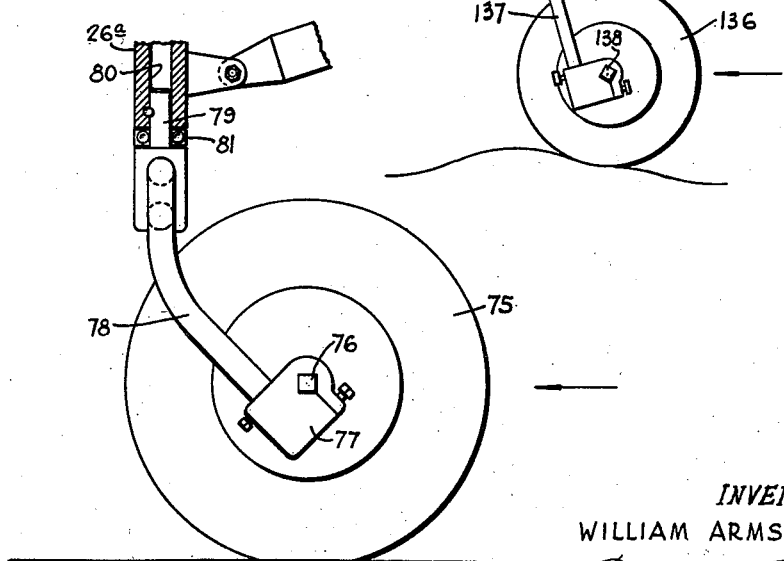

Patented July 6, 1943

2,323,640

UNITED STATES PATENT OFFICE 2,323,640

LEVERED SUSPENSION LANDING GEAR

William Armstrong, Long Island City, N. Y., assignor to The Dowty Corporation, Wilmington, Del., a corporation of Delaware Application June 10, 1940, Serial No. 339,728

7 Claims. (Cl. 244—102)

This invention relates to landing gears for airplanes and particularly to levered suspension type landing gears.

An object of the invention is to provide a landing gear wherein the wheel is cantilevered from a supporting strut in such a manner that the caantilever mechanism and cooperating shock absorber is mounted above and in planar alignment with the wheel of the landing gear.

Another object of the invention is to provide a levered type of landing gear arranged in such a manner that the levers and supporting members form the sides of a collapsible quadrilateral figure wherein means are provided to control the collapsing of the figure.

Another object of the invention is to provide a levered landing gear mechanism arranged in such a manner that the levers and supporting members form a collapsible figure in the form of a trapezium, and wherein means are provided for controlling collapsing of the figure.

Another object of the invention is to provide a levered type landing gear suspension wherein the mechanism for supporting the landing wheel is arranged within an area defined by the vertical dimensions of the wheel.

Another object of the invention is to provide a levered type landing gear suspension wherein the mechanism is arranged to form a quadrilateral figure and wherein the landing wheel is arranged within limits of the quadrilateral.

Another object of the invention is to provide a retractable landing gear of the lever suspensioned type arranged in a manner that the retracting mechanism and the levered arrangement of the landing gear can be retracted into one compartment of an airfoil and the wheel be retained in another adjacent compartment of the airfoil, the compartments being divided by a spar.

A still further object of the invention is to provide a retractable landing gear of the lever suspended type wherein the lever suspending means and a cooperating shock absorber are arranged within limits defined by the vertical dimensions of the landing wheel so that the landing gear mechanism and the wheel can be retracted within an airfoil having a narrow cross-section.

Another object of the invention is to provide a levered type of landing gear arranged in such a manner that the levers and supporting members form the sides of a collapsible quadrilateral figure wherein means are provided to control the collapsing of the figure, the arrangement of which provides the greatest vertical wheel travel for the least stroke of the shock absorber.

Further objects and advantages of the present invention will be apparent from the drawings and a reading of the description which follows.

In the drawings:

Figure 1 is a side elevational view of an airplane, having the tail portion broken away, showing the landing gear of this invention as applied thereto;

Figure 2 is a cross-sectional view through an airfoil or wing, showing a side elevation of the landing gear in extended landing position;

Figure 3 is a view similar to Figure 2 but shows the operation of the landing gear mechanism while riding over an irregularity of the ground;

Figure 9 is a side elevational view, with the airfoil in cross-section, showing a modified form of arrangement of the levered landing gear suspension in landing position;

Figure 10 is a view similar to Figure 9 but shows the action of the landing gear mechanism while riding over an irregularity of the ground;

Figure 11 is a partial cross-sectional view and shows a method of attaching a landing wheel to a strut to provide a caster type wheel.

Figure 4:
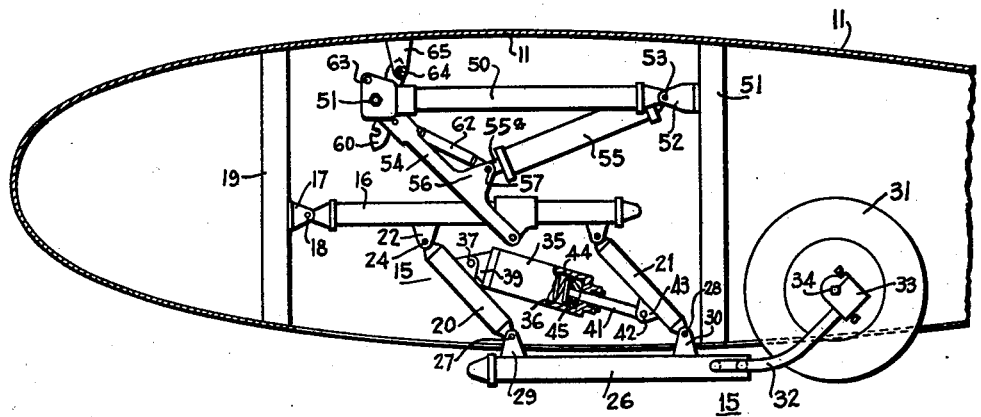
Figure 4 is a transverse cross-sectional view of an airplane showing a side elevational view of the retracting mechanism and landing gear in the retracted position within the airfoil.
Figure 5:
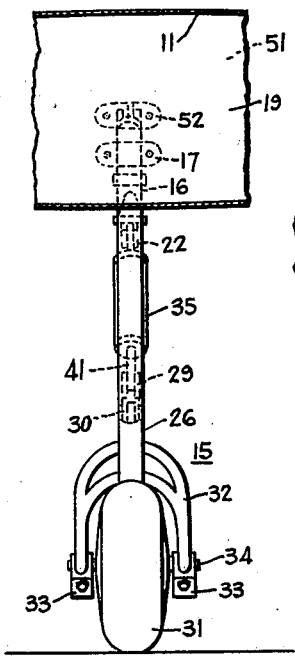
Figure 5 is a front view of the landing gear shown in Figure 2.

In landing gear structures for use upon airplanes, and particularly in regard to retractable landing gears, difficulty has arisen when levered, or cantilevered, landing gear structures were retracted within the airfoil or wing of the airplane. In the former types of cantilevered landing gears the levers and the shock absorbing means disposed between the levers and the supporting strut have been disposed adjacent a side of the landing wheel, thereby increasing the width of the landing gear structure. It has been difficult to retract such cantilevered landing gears into airfoils having a narrow cross-section, particularly where the landing gear mechanism was retracted sidewise in order to lie longitudinally within the airfoil.

There has also arisen considerable difficulty when rearwardly retracting landing gear mechanisms into an airfoil in that it has been necessary to cut a spar and reenforce the same to provide sufficient room for the landing gear mechanism and the wheel within the airfoil. The dimensions between adjacent spars is insufficient to permit full retraction of a landing gear within one compartment provided between the spars which resulted in the above mentioned occurrence.

Also the landing gear structures of the levered type heretofore commonly used upon airplanes and designated as cantilevered landing gears, have been limited in their stroke of travel. This limitation on vertical travel of the wheel of the landing gear would not permit the landing gear to absorb the shock occurred when the wheel was moving over extremely irregular ground. The limitation of stroke of the former cantilevered landing gears has been due, to a certain extent, to the diameter of th landing gear in that it was not desirable that the axle of the landing wheel be positioned extreme distances from the supporting strut extending from the airplane. If the cantilevered arm was made long the wheel would extend a considerable distance from the mounting strut.

In the device of this invention it is possible to obtain greater leverage of the landing wheel than has heretofore been accomplished, and still retain the landing gear mechanism within the diameter of the landing wheel. Since the mechanism of this invention is adapted to be mounted above a landing wheel and in alignment therewith, the levers for carrying the wheel strut of this device may be of a length equal to the diameter of the landing wheel and be attached to a mounting strut extending from the airplane, the arrangement being such that the wheel strut, the mounting strut and the interconnecting levers being confined within the diameter of the landing wheel and forming a collapsible quadrilateral figure. The stroke of the quadrilateral figure is controlled by suitable shock absorbing means, the stroke of which can be extremely short in proportion to the stroke of the landing wheel, thereby eliminating bulky and cumbersome shock absorbing devices.

This invention obviates the difficulties heretofore encountered. The landing gear of this invention consists of a support member which may be rigid with respect to the airplane, or may be connected to suitable retracting mechanism for retracting the landing gear. This support member, or strut, is arranged with pivotally mounted extending lever arms. The free ends of the pivotally mounted arms, or hinge links, are also pivotally secured to a wheel supporting strut member in such a manner that the mounting strut, the wheel strut and the interconnecting arms, or hinge links, form the sides of a quadrilateral figure. Since the mounting strut is fixed in its relative position upon the airplane it may readily be seen that the wheel strut is capable of vertical movement with respect to the mounting strut. This vertical movement can be quite large and is limited only by the clearance between the hinge links and the wheel or with regard to some stationary part of the airplane. To prevent complete collapsing of the quadrilateral figure a shock absorber is positioned upon a diagonal of the quadrilateral figure whereby the degree of collapsing of the figure is controlled.

In the drawings I have shown the landing gear apparatus as being applied to an airplane 10 having an airfoil 11 in which a motor nacelle 12 is positioned. A suitable driving motor is positioned within the nacelle 12 and drives the propeller 13 for moving the airplane through the air. A landing gear 15 is adapted to be retractably mounted with respect to the airfoil or wing 11.

This landing gear 15 consists of a mounting strut 16 which is pivoted at one end thereof upon an extending bracket 17 by means of a pivot pin 18. The bracket 17 is secured to a spar 19 of the airfoil or wing 11. A pair of hingedly mounted arms, or hinge links, 20 and 21 are pivotally mounted upon the brackets 22 and 23 which extend from the mounting strut 16. The hinge links 20 and 21 are pivotally secured to the extending brackets 22 and 23 by means of the hinge pins 24 and 25, respectively.

The opposite ends of the hinge links 20 and 21 are pivotally secured upon a wheel strut 26 by means of pivot pins 27 and 28 which extend through the brackets 29 and 30, respectively, attached to the wheel strut 26. A landing wheel 31 is mounted upon the wheel strut 26 by means of a cantilever arm 32 which comprises a fork extending upon adjacent sides of the wheel 31. Suitable bearings 33 are provided upon each end of the fork 32 and are interconnected by means of an axle 34 upon which the wheel 31 is suitably mounted.

As will be noted in the drawings from Figures 2 to 5, the mounting strut 16, the wheel strut 26 and the interconnecting hinge links 20 and 21 are arranged in planar alignment and above the landing wheel 31. This arrangement permits the wheel strut 26 to move vertically in a plane with the hinge links 20, 21 and the mounting strut 16, whereby the vertical movement may be quite large, dependent only upon clearance between the moving parts and the respective links of the hinge links 20 and 21.

To control the vertical collapsing of the quadrilateral figure formed by the mounting strut 16, the wheel strut 26 and the hinge links 20 and 21, a shock absorber 35 is positioned upon a diagonal across opposite sides of the quadrilateral figure. The shock absorber 35 may be positioned either upon a true diagonal of the quadrilateral figure or may be positioned upon a diagonal crossing opposite sides of the quadrilateral figure and positioning of the shock absorber upon a diagonal other than a true diagonal determining to a considerable extent the stroke of the shock absorber with respect to the vertical stroke of the wheel strut 26. It may readily be seen that as opposite ends of the shock absorber 35 are moved from a true diagonal of the quadrilateral figure along opposite sides to a position other than a true diagonal the stroke of the shock absorber can be shortened while the stroke of the wheel strut 26 remains the same, until the positions at opposite ends of the shock absorber 35 reach a neutral point upon opposite side walls of the quadrilateral figure wherein the shock absorber will have no stroke whatever. It is thus seen that the shock absorber may be proportioned to the stroke of the wheel strut 26 from a maximum upon a true diagonal of a quadrilateral figure to a minimum upon a diagonal other than a true diagonal.

As disclosed in the drawings, the shock absorber 35 consists of a body 36 one end of which is pivotally connected to the hinge link 20 by means of a pin 37 extending through a bracket 38 positioned on the hinge link 20 and a bracket 39 secured to the body 36. A piston 40 is provided within the shock absorber 35 and has a connecting rod 41 secured thereto and extending through the body 36. The connecting rod 41 is pivotally secured to the hinge link 21 by means of a pin 42 extending through a bracket 43 positioned upon the hinge link 21.

A spring 44 is mounted within the body 36 of the shock absorber 35 and has one end thereof in engagement with the wall of the body 36 and the opposite end thereof in engagement with the piston 40. A leak port 45 is provided in the piston 40 to permit passage of oil within the shock absorber body 36 to move fore and aft of the piston 40 when the shock absorber is in operation.

As will be noted by a comparison of Figures 2 and 3, the stroke of the shock absorber 35 is considerably less than the vertical stroke of the wheel strut 26 when passing over an irregularity of the ground, and as has heretofore been mentioned the stroke of the shock absorber may be proportioned to the stroke of the wheel strut to obtain most any desired proportion between the same. This arrangement enables a large movement of the wheel strut over rough terrain to provide a smoother and softer landing of the airplane, thereby reducing the shock of landing and the stress placed upon various elements of the airplane due to landing shock.

The arrangement of a collapsible quadri-lateral figure, forming a levered landing gear suspension, provides an apparatus which allows greater movement of the landing wheel with respect to the airplane than has heretofore been practical upon the usual type of cantilevered suspensions. The former cantilevered suspensions, wherein the wheels were cantilevered directly from a mounting strut, have been limited in movement either by the diameter of the landing wheel or by the stroke of a shock absorber which could be internally mounted within the diameter of the wheel. It may readily be seen that the apparatus of this invention has no such limitation since the collapsible quadrilateral figure is positioned above the wheel and preferably in planar alignment therewith. Since the apparatus is positioned above the wheel, the hinge links 20 and 21 can be made as long as desirable for whatever movement is desired. Thus movement of the wheel strut 26 is determined only by the clearance between the wheel strut 26 and the stationary parts of the airplane. Regardless of the length of the stroke of the wheel strut 26, the positioning of the shock absorber 35 upon a diagonal across opposite sides of the quadrilateral figure can be such that the normal stroke thereof will be in the proportion to the stroke of the wheel strut 26, thereby eliminating the necessity for shock absorbers with extremely long strokes.

To provide means for retracting the landing gear 15 into the airfoil of an airplane, a suitable retracting mechanism is provided and may be operated in any one of a number of ways. As disclosed in this application, the retracting mechanism consists of a nutcracker type radius rod having a portion 50 hingedly mounted to a spar 51, see Figure 5, upon a bracket 52 by means of the hinge pin 53. A second portion 54 of the nutcracker radius rod is hingedly mounted to the portion 50 by means of the hinge pin 51 and to the mounting strut 16 by means of the hinge pin 52 extending through a bracket 52a mounted upon the strut 16. A hydraulically operated retracting jack 55 is mounted at one end thereof upon the bracket 52 by means of the hinge pin 53, and has the connecting rod 55a thereof attached to the bracket 56 of the portion 54 by means of a hinge pin 57.

The hydraulically operated retracting jack 55 may be of any conventional structure wherein a piston is operated to and fro within the jack 55 through a suitable fluid system. The fluid system is connected to opposite ends of the jack through suitable valves for directing flow of fluid to the jack at opposite ends thereof to cause reciprocation of a piston within the body of the jack, thereby causing reciprocation of the connecting rod 55a. Such hydraulic systems are old in the art and further description thereof is not deemed necessary.

When the landing gear 15 is to be retracted within the airfoil of the airplane, the fluid system for the retracting jack 55 is operated to cause retraction of the connecting rod 55a thereby pulling upon the hinge pin 57 and bracket 56 in a manner to cause the portion 54 of the nutcracker radius rod to hinge about the hinge pin 51 thereby pulling the landing gear 15 rearwardly transversely of the airfoil 11 of the airplane. A suitable locking system is arranged upon the retracting device for securing the landing gear both in landing position and in retracted position. These locking systems are common to retractable landing gear mechanisms and as disclosed in the drawings, see Figures 2 to 4, inclusive, consists of a latch lock 60 pivotally mounted upon a hinge pin 61. A connecting link 62 is interposed between the latch lock 60 and the hinge pin 57 in the bracket 56. The latch lock 60 is thus mechanically linked with movement of the portions 50 and 54 of the nutcracker type radius rod so that when the landing gear 15 is in the landing position, as shown in Figures 2 and 3, the latch lock 60 will engage a pin 63 to secure the landing gear in landing position.

When the landing gear is in retracted position, as shown in Figure 4, the latch lock 60 will engage a pin 64 positioned in a bracket 65 mounted upon the airfoil 11, thereby securing the landing gear in the retracted position. Suitable means are provided for unlatching the latch lock by initial movement of the retracting jack 55, and since such mechanisms are conventional further disclosure thereof is not deemed essential.

The arrangement of the landing apparatus into a quadrilateral figure as heretofore disclosed, provides an arrangement whereby the mechanism of the landing gear and the mechanism for retracting the landing gear can be positioned within one compartment of an airfoil while the landing wheel is positioned in an adjacent compartment thereof, the compartments being divided by a spar. When retracting landing gears wherein the wheel is mounted directly upon a mounting strut, and this strut is hingedly mounted upon a spar of an airfoil, it has been impossible to retract the landing gear mechanism and the wheel into the airfoil without cutting the spar adjacent thereto. The apparatus of this invention eliminates this difficulty.

As disclosed in Figure 4, the mounting strut 16 for the landing gear 15 is hingedly mounted to the spar 19 upon the bracket 17 by means of the hinge pin 18. The wheel strut 26 is spaced from but substantially parallel to the mounting strut 16 by means of the hinge links 20 and 21. This relation of the mounting strut 16 and the wheel strut 26 is retained by the shock absorber 35, since the spring 44 thereof will retain the shock absorber in extended position when the landing gear is in retracted position. The wheel 31 being mounted upon the cantilever arm 32 in a rearward direction with respect to the mounting strut 16 provides an arrangement whereby the wheel 31 is brought substantially within the dimensions of the quadrilateral figure of the landing gear 15, so that when the landing gear 15 is in the retracted position the wheel 31 will lie within a plane defined by the limits of the quadrilateral figure of the landing gear 15. As will be noted in Figure 4, the wheel 31 is thus disposed upwardly from the wheel strut 26 when the wheel strut is retracted adjacent the bottom edge of the airfoil 11 whereby the wheel will be retracted into the airfoil 11. The arrangement thus provides sufficient room between the wheel 31 and the landing gear 15 into which the spar 51 may project, the landing gear of the retracting mechanism being positioned within one compartment between the spars 19 and 51 while the wheel 31 is positioned in a compartment adjacent the spar 51.

The landing gear 15 may also be used to support a nose wheel for an airplane without alteration except for the method of attaching the wheel to the wheel strut 26. In the case of a nose wheel, it must be of a caster type. As disclosed in Figure 11, the nose wheel 75 is supported upon an axle 76 which in turn is bearinged in a bearing casting 77. The bearing casting 77 is positioned upon the ends of a cantilever arm 78 which forms a yoke around the wheel 75. The cantilever arm 78 is provided with an extension 79 thereon which is journaled into an opening 80 within the wheel strut 26a. A suitable thrust bearing 81 is positioned between the wheel strut 26a and the arm 78. The landing gear 15 supporting the castered wheel 75 may be retracted within the nose of the fuselage of the airplane 10 by a suitable mechanism as has heretofore been described with regard to Figures 2 to 4, inclusive.

Figure 6:
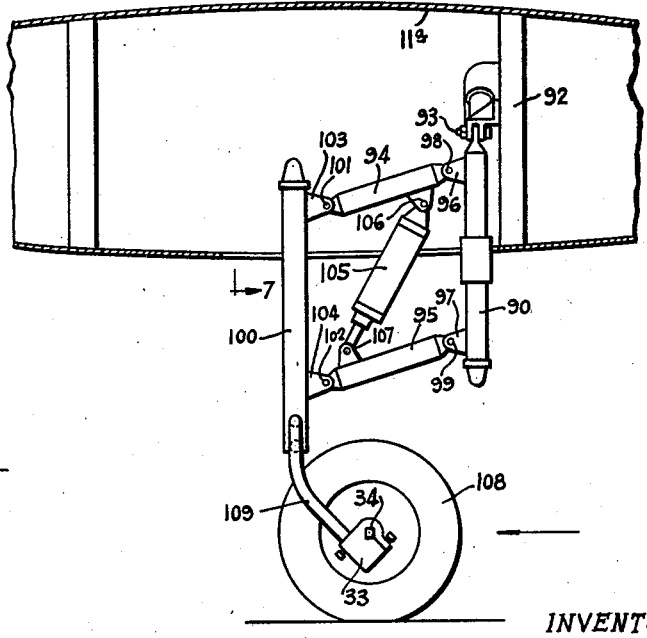
Figure 6 is a transverse cross-sectional view of an airfoil showing the landing gear mechanism in elevation as applied to an airfoil for sidewise retraction into the airfoil.
Figure 7:
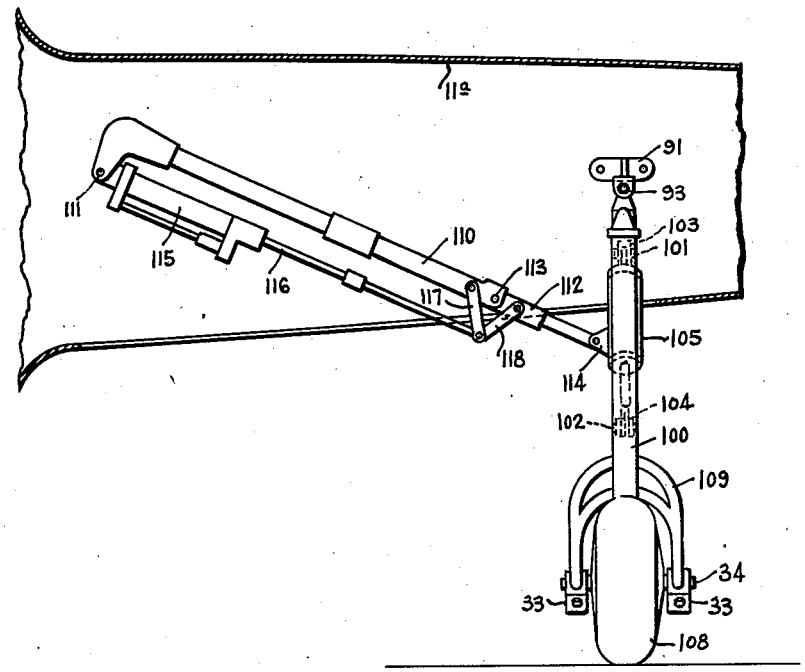
Figure 7 is a longitudinal cross-sectional view taken along line 7—7 of Figure 6.
Figure 8:
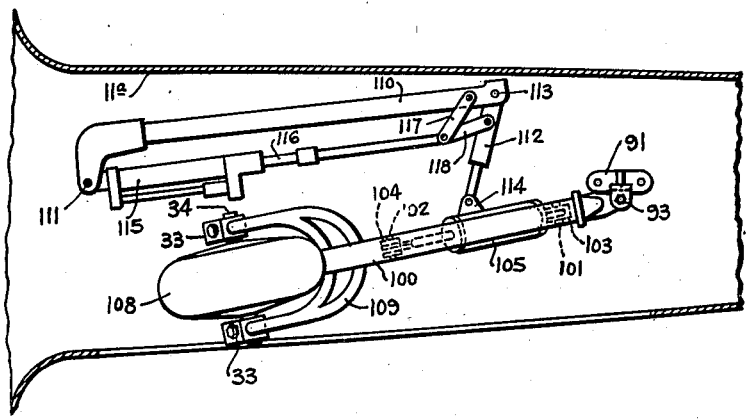
Figure 8 is a view similar to Figure 7 showing, however, the landing gear in the retracted position within an airfoil.

As disclosed in Figures 6 to 8, inclusive, the landing gear mechanism is adapted for sidewise retraction into a narrow cross-section of an airfoil. The quadrilateral configuration of the landing gear mechanism and the positioning of the quadrilateral configuration above the landing wheel provides definite advantages for sidewise retraction of a landing gear apparatus into the narrow cross-section of an airfoil. The various elements of the landing gear which cooperate to form the quadrilateral figure as well as the shock absorbing means are arranged in planar alignment with respect to each other and in planar alignment with the wheel of the landing gear. The normal width of the wheel including the tire thereupon, is considerably more than the normal width of the struts and shock absorbing means of landing gears, and since the landing gear apparatus is in planar alignment with the landing wheel it may be seen that the width of the landing gear apparatus may be confined within vertical dimensions extending from the wheel of the landing gear. This arrangement provides an apparatus of which the widest portion will be the yoke surrounding the wheel which carries the axle for the same.

In former levered or cantilevered landing gears, the cantilever and the shock absorber have been positioned adjacent a side of the landing wheel, which of necessity requires a much wider construction than is required by the structure of this invention, and hence could not be retracted within as narrow an airfoil section as the apparatus of this invention.

The landing gear apparatus, including the retracting mechanism, as disclosed in Figures 6 to 8, inclusive, includes a mounting strut 90 which is supported at the upper end thereof upon a bracket 91 secured to a spar 92 of an airfoil 11a. A hinge pin 93 extends through the bracket 91 and the upper end of the mounting strut 90 to permit the strut 90 to be moved longitudinally with respect to the airfoil 11a, whereby the landing apparatus carried upon the mounting strut 90 will be retracted into the airfoil 11a and be positioned horizontally and longitudinally within the airfoil.

Hinge links 94 and 95 are hingedly mounted upon brackets 96 and 97 extending from the mounting strut 90 by means of the hinge pins 98 and 99, respectively. The opposite ends of the hinge links 94 and 95 are hingedly connected to a wheel strut 100 by means of hinge pins 101 and 102 extending through mounting brackets 103 and 104, respectively, positioned upon the wheel strut 100. It is thus seen that I have provided a collapsible quadrilateral figure for supporting the wheel strut with respect to the mounting strut which will allow large vertical travel of the wheel strut 100.

Shock absorbing means 105 are provided upon a diagonal across opposite sides of the quadrilateral figure and has one end thereof attached to the hinge link 94 by means of a hinge connection 106 and the opposite end thereof attached to the hinge link 95 by means of a hinge connection 107. The shock absorber 105 controls the collapsing of the quadrilateral figure when the airplane rests upon the landing gear structure.

A landing wheel 108 is suitably mounted upon a cantilever arm 109 which forms a yoke around the wheel 108, and which arm is attached to the wheel strut 100.

As heretofore described with respect to landing gear of Figures 1 to 5, inclusive, the quadrilateral figured formed by the arrangement of the mounting strut 90, the wheel strut 100 and the hinge links 94 is arranged so that the respective members are all in planar alignment as is the shock absorber 105. The landing gear system is also in planar alignment with the landing wheel 108. The cantilever arm 109, which is a supporting yoke for the wheel 108, is in this construction the widest element of the landing gear assembly, the remainder of the mechanism being confined within dimensions limited by the width of the landing wheel as well as by the circumference thereof.

A suitable retracting mechanism is positioned within the airfoil 11a and is connected to the mounting strut 90 to cause the same to be moved longitudinally with respect to the airfoil 11a to be retracted therein and be positioned horizontally within the same when in retracted position.

The retracting mechanism may consist of a nutcracker type radius rod having one portion 110 hingedly mounted to a suitable support member within the airfoil 11a as indicated at 111, and a second portion 112 hingedly mounted upon the portion 110 by means of a hinge pin 113 and to the mounting strut 90 by means of the bracket 114 carrying a suitable hinge pin. A retracting jack 115 is carried upon the hinge pin 111 and has a reciprocal rod 116 extending therefrom which is adapted to operate the links 117 and 118 to cause retraction of the landing gear. The retracting jack 115 is connected to a suitable fluid system for operating a piston within the jack in a well-known and conventional manner.

When the landing gear, carrying the wheel 108, is to be retracted within the airfoil 11a the reciprocal rod 116 is drawn inwardly into the retracting jack 115 to cause the links 117 and 118 to collapse, thereby swinging the arm 112 about the pivot 113 whereby the landing gear is moved upwardly into the airfoil. For the sake of clarity and to show a means for retracting the landing gear longitudinally of the airfoil, the retracting mechanism and the landing gear have been shown as disposed adjacent each other when in collapsed or retracted position, see Figure 8. It is obvious, however, that within the spirit of this invention, in that the width of the landing wheel is reduced to its narrowest dimension, that the retracting mechanism can be positioned within the airfoil so that when the landing gear is retracted within the airfoil the retracting mechanism and the landing gear will lie in substantial horizontal planar alignment. Since the working mechanism of the landing gear of this invention lies within a dimension defined by the width of the landing wheel, or the supporting axle yoke, the landing gear can thus be retracted into an airfoil section not substantially greater than the width of the landing wheel.

In Figures 9 and 10, there is shown a slightly modified arrangement of the supporting elements for the landing gear wherein the quadrilateral figure formed by the various elements of the landing gear are arranged as a trapezium rather than as a parallelogram, as disclosed with regard to Figures 1 to 8, inclusive. In this arrangement, I have shown a mounting strut 125 as being rigidly supported to a spar 126 of an airfoil 11b by means of a bracket 127. Hinge links 128 and 129 are hingedly mounted upon the mounting strut 125 by means of hinge connections 130 and 131, respectively. The opposite ends of the hinge links 128 and 129 are hingedly mounted upon a wheel strut 132 by means of the hinge connections 133 and 134, respectively. A shock absorber 135 is positioned across a diagonal of the trapezium and is connected at one end to the hinge connection 130 and the opposite end thereof to the hinge connection 134. A landing wheel 136 suitably mounted upon an arm 137 which provides a fork around the wheel upon which the wheel may be suitably mounted upon an axle 138. In this modification the elements of the landing gear structure comprising the mounting strut 125, the wheel strut 130, the hinge links 128 and 129 and the shock absorber 135 are all arranged in planar alignment above the landing wheel 136 and in planar alignment therewith. The width of the apparatus is such as not to be greater than the width of the landing wheel, while the landing wheel is of such diameter as to not be greater than the greatest dimension of the trapezium figure.

It may thus be seen that the landing gear of this invention provides many advantages over former landing gear structures and particularly over former levered or cantilevered landing gears, and while a preferred form has been disclosed it is to be understood the invention is not to be so limited, but to include all forms which fall within the scope of the claims.

Having thus fully described my invention, what I claim as new and desire to secure by Letters Patent, is:

1. A landing gear for an aircraft adapted to be retracted into the airfoil thereof comprising a mounting strut, a wheel strut cantilevered forwardly of said mounting strut by means of an articulated quadrilateral frame of which said strut forms the foremost member, a landing wheel cantilevered rearwardly from said wheel strut and positioned with respect the same that the foremost portion of said wheel is not further forward than the foremost portion of said wheel strut, means for resiliently resisting movement of said wheel strut with respect said mounting strut in its spaced planar relation to permit vertical shock absorption movement of said wheel strut, means for retracting said landing gear into to the airfoil of an aircraft to position said gear and said retracting mechanism in one compartment and said wheel in another compartment of the airfoil in the same relative positions as when in extended condition, said compartments being separated by a structural member of the aircraft.

2. In an airplane landing gear, a mounting strut adapted to be carried by an aircraft, a landing element strut positioned forwardly of said mounting strut with respect to the fore and aft relations of the aircraft, a landing wheel having a pivotal axis for supporting the same upon said landing element strut, said axis being positioned in trailing relation to said landing element strut, the forward edge of said landing wheel being not further forward than the forward edge of said landing element strut, hinge links interconnecting said struts and forming therewith an articulated quadrilateral frame arranged in a plane which is in vertical longitudinal alignment with said wheel, said hinge links extending forwardly of said mounting strut and downwardly therefrom when the landing gear supports the normal load of an aircraft, and means positioned between said struts to resiliently absorb shock and resist recoil.

3. In an airplane landing gear, a mounting strut, a wheel strut having a rearwardly cantilever mounted wheel positioned with respect to the fore and aft relations of the aircraft, hinge links interconnecting said struts and extending forwardly of said mounting strut and downwardly therefrom when the landing gear supports the normal load of the aircraft, said struts and said hinge links forming sides of an articulated quadrilateral frame arranged in planar alignment with said wheel, said wheel being arranged between the fore and aft dimensional limits of said quadrilateral frame and below the same, and means positioned between said struts to resiliently resist vertical movement of said frame and recoil thereof.

4. A landing gear for an aircraft adapted to be retracted within the aircraft comprising a mounting strut, means adapted to be secured to an aircraft for pivotally supporting said mounting strut, a landing element supporting strut, parallel hinge links extending forwardly of said mounting strut and downwardly therefrom, means pivotally mounting said hinge links upon said mounting strut and said landing element strut, a landing element having a pivotal axis for supporting the same upon said landing element strut, said axis being in trailing relation to said landing element strut, said mounting strut hinge links and landing element strut forming sides of an articulated quadrilateral frame, means positioned diagonally of opposite sides of said quadrilateral frame to resiliently resist deformation and recoil of said frame, said quadrilateral frame being disposed above and in planar alignment with the longitudinal axis of said landing element, said landing element being disposed within vertical dimensional limits defined by the fore and aft extremities of said quadrilateral frame, and means connected to said mounting strut for retracting said frame to dispose the same within an aircraft with said landing element strut disposed substantially parallel to the aircraft.

5. A landing gear for an airplane comprising a mounting strut, a landing element strut, parallel hinge links extending forwardly of said mounting strut and pivotally mounted upon said mounting strut and said landing element strut, a landing element supported by said landing element strut having a horizontal axis, said axis being disposed in trailing relation to said landing element strut, said mounting strut hinge links and landing element strut forming sides of an articulated quadrilateral frame, means positioned diagonally of opposite sides of said quadrilateral frame to resiliently resist deformation and recoil of said frame, said quadrilateral frame being disposed above and in planar alignment with the longitudinal axis of said landing element, said landing element being disposed within vertical dimensional limits defined by the fore and aft extremities of said quadrilateral frame, means for retracting said landing gear into the airfoil of an aircraft to position said gear and said retracting mechanism in one compartment and said wheel in another compartment of the airfoil, said gear and said wheel being disposed in their same relative positions as when in extended condition.

6. In a lever suspended retractable landing gear mechanism for an aircraft, a mounting strut adapted to be pivotally connected to an aircraft and be connected to a retracting mechanism, a landing element, a vertically positioned articulated quadrilateral frame forming a rhomboid interposed between said landing element and said mounting strut for resiliently supporting said landing element thereupon, said rhomboid frame being disposed forwardly of said mounting strut and directed upon a downwardly inclined angle when supporting the normal weight of an aircraft, shock absorbing means positioned within said frame and connecting opposite walls thereof, said landing element and said frame being correlated in size that said landing element is arranged within vertical dimensions defined by the fore and aft extremities of said frame when said frame is in an unloaded condition, whereby minimum space is occupied by the landing gear upon retraction thereof and maximum movement of said frame is obtained for shock absorption.

7. In a lever suspended retractable landing gear mechanism for an aircraft, a mounting strut adapted to be pivotally connected to an aircraft and be connected to a retracting mechanism, a wheel strut, hinge links extending forwardly of said mounting strut interconnecting said struts, said struts and said hinge links forming the sides of an articulated rhomboid frame extending forwardly of said mounting strut at a downwardly inclined angle therefrom, a landing wheel carried upon a rearwardly directed cantilever arm extending from said wheel strut, shock absorbing means positioned diagonally of opposite sides of said rhomboid frame, said struts hinge links and shock absorbing means being disposed above said wheel, said wheel being positioned with respect to said frame and correlated thereto that said wheel is arranged within vertical dimensions defined by the fore and aft extremities of said frame when said frame is in an unloaded condition, whereby minimum space is occupied by the landing gear upon retraction thereof and maximum movement of said frame is obtained for shock absorption.

WILLIAM ARMSTRONG.